United States Patent
Hartmann (10) Patent No.: US 8,572,188 B1
(45) Date of Patent: Oct. 29, 2013

(54) SYSTEMS AND METHODS FOR INTEGRATING THE MANAGEMENT OF A TEMPORARY EMAIL ADDRESS WITHIN AN EMAIL CLIENT APPLICATION

(75) Inventor: Alfred Hartmann, Round Rock, TX (US)

(73) Assignee: Symantec Corporation, Mountain View, CA (US)

( * ) Notice: Subject to any disclaimer, the term of this patent is extended or adjusted under 35 U.S.C. 154(b) by 537 days.

(21) Appl. No.: 12/476,722

(22) Filed: Jun. 2, 2009

(51) Int. Cl.
*G06F 15/16* (2006.01)

(52) U.S. Cl.
USPC ............................................ 709/206; 709/205

(58) Field of Classification Search
USPC ................................................. 709/205, 206
See application file for complete search history.

(56) References Cited

U.S. PATENT DOCUMENTS

| | | | |
|---|---|---|---|
| 6,725,269 B1* | 4/2004 | Megiddo ....................... | 709/228 |
| 2005/0198518 A1* | 9/2005 | Kogan et al. .................. | 713/188 |
| 2006/0031302 A1* | 2/2006 | Nuortila ........................ | 709/206 |
| 2007/0180039 A1* | 8/2007 | Sutidze et al. ................ | 709/206 |
| 2008/0052364 A1* | 2/2008 | Zhou ............................. | 709/206 |
| 2009/0320109 A1* | 12/2009 | Salada et al. .................... | 726/6 |

\* cited by examiner

*Primary Examiner* — Tauqir Hussain
(74) *Attorney, Agent, or Firm* — Holland & Hart LLP (57) ABSTRACT

A computer-implemented method for integrating the management of a temporary email address within an email client application is described. An email client application is provided. A function of the email client application is modified. An attribute is added to the modified function. The attribute is configured to allow the selection of a temporary email address or a non-temporary email address. The selected email address is set as a default email address for the modified function.

12 Claims, 12 Drawing Sheets

SYSTEMS AND METHODS FOR INTEGRATING THE MANAGEMENT OF A TEMPORARY EMAIL ADDRESS WITHIN AN EMAIL CLIENT APPLICATION

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

In addition, more and more homes are using computers. Computers within homes may also be connected to computer networks, such as the Internet. The use of the Internet within a home has increased dramatically. The Internet has increased the ability to communicate with others through electronic mail (email), instant messages, etc. Further, a user may search for information relating to virtually any subject on the Internet. Search engines allow a user to search for any type of data on almost any kind subject ranging from government law and services, trade fairs and conferences, market information, new ideas and technical support, etc.

The use of email communications between individuals, companies, etc. has increased dramatically. Email addresses may be requested when a user registers to receive information from a particular company, individual, etc. Users of email communications may have several email addresses. For example, a user may have a main (or permanent) email address that is shared with family, friends, etc. and secondary (or temporary) email addresses that may be used when registering with a particular website, company, etc. Services exist which provide these temporary email addresses. In order to manage temporary email addresses, a user interacts with a different management console for each temporary email address. Interacting with multiple consoles is inefficient, time-consuming, and tedious. As shown from the above discussion, there is a need for systems and methods for integrating the management of a temporary email address within an email client application.

SUMMARY

A computer-implemented method for integrating the management of a temporary email address within an email client application is described. An email client application is provided. A function of the email client application is modified. An attribute is added to the modified function. The attribute is configured to allow the selection of a temporary email address or a non-temporary email address. The selected email address is set as a default email address for the modified function.

In one embodiment, the function may be an address book function provided with the email client application. The attribute may be configured to allow the selection of a temporary email address or a non-temporary email address. The selected address may be associated with an entry in the address book function. In one example, a determination may be made as to whether an entry in the address book function is marked for deletion. In addition, a determination may be made as to whether a temporary email address is associated with the entry that is marked for deletion. In one embodiment, a temporary email address may be deprovisioned if the temporary email address is associated with an entry marked for deletion.

In one configuration, the function of the email client application may be a compose mail function. The attribute may be configured to allow the selection of a temporary email address or a non-temporary email address to be designated as a return email address for a new email message created by the compose mail function. In one embodiment, a determination may be made as to whether a new email message is intended for more than one recipient. If more than one recipient is intended to receive the email message, a determination may be made as to whether a different return email address is associated with each recipient.

In one embodiment, an incoming email message may be received. In addition, a determination may be made as to whether a sender of the email message is associated with a temporary email address. Further, the incoming email message may be identified as spam and the temporary email address associated with the sender of the message may be deprovisioned.

In one example, an incoming email message may be received and a determination may be made as to whether a sender of the message is associated with a temporary email address. In addition, a determination may be made as to when the email message is deleted from the email client application. In one embodiment, the temporary email address may be deprovisioned based on when the email message is deleted.

A computer system configured to integrate the management of a temporary email address within an email client application is also described. The computer system may include a processor and memory in electronic communication with the processor. The computer system may also include an email client application configured to manage temporary and non-temporary email addresses. Further, the computer system may include a temporary email address management module configured to integrate with the email client application. The temporary email address management module may also be configured to modify a function of the email client application. In addition, the temporary email address management module may be configured to add an attribute to the modified function. The attribute may be configured to allow the selection of a temporary email address or a non-temporary email address. Further, the management module may be configured to set the selected email address as a default email address for the modified function.

A computer-program product for integrating the management of a temporary email address within an email client application is also described. The computer-program product may include a computer-readable medium having instructions thereon. The instructions may include code programmed to provide an email client application and modify a function of the email client application. The instructions may also include code programmed to add an attribute to the modified function. The attribute may be configured to allow the selection of a temporary email address or a non-temporary email address. The instructions may also include code programmed to set the selected email address as a default email address for the modified function.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Temporary email accounts may be employed to avoid the receipt of unsolicited emails (e.g., spam emails) from web sites or web services. These temporary accounts may also be used to preserve the privacy of the user. There are a wide variety of temporary email account services, but current services suffer from a lack of integration with an email application that manages non-temporary (or permanent) email addresses. Temporary email account services generally require a user to interface with a management console that is separate from the email application in order to effectively manage the temporary email accounts. For example, the separate management console may be a web based console where a user is able to manage his/her temporary email accounts. In addition, management policies across temporary email account providers may not be consistent. Further, the presentation or functionalities of the management consoles may be unique for each temporary email account provider. Manual management of each temporary email account via a separate management console is tedious and time consuming.

In one embodiment, the management of temporary email accounts may be automated by simple integration with the email application that is used to manage non-temporary email accounts. Integration with the email application helps avoid the need for a user to interface with a separate management console for each temporary email account. In addition, the integration may eliminate the need for the user to take extra steps to avail himself/herself of the system functionality and account flexibility provided by the various temporary email account providers. The present systems and methods, simplify, automate, and normalize the management of temporary email account servicing by integrating the management of these temporary accounts with a email application that may be used to manage non-temporary email accounts.

Figure 1:
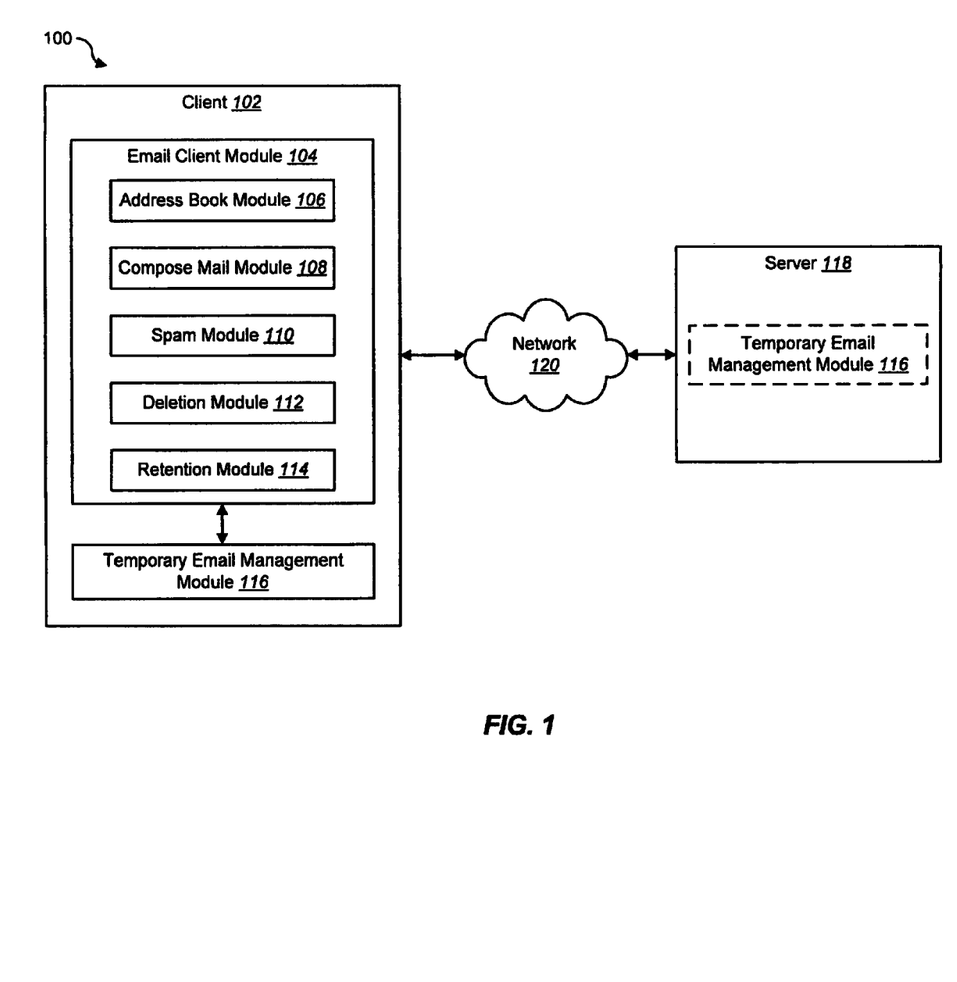
FIG. 1 is a block diagram illustrating one embodiment of a client computing device that may implement the present systems and methods.

FIG. 1 is a block diagram illustrating one embodiment 100 of a client computing device 102. In addition, the client 102 may communicate with a server 118 over a network connection 120. In one embodiment, the client 102 may be, without limitation, a workstation, a laptop, a personal digital assistant ("PDA"), a handheld device, or any other type of computing system or device.

The client 102 may include an email client module 104 (or email application). In one embodiment, the email client module 104 may be a front-end computer program that is used to manage email accounts. Examples of the email client module 104 may include Microsoft Office Outlook, Microsoft Entourage, Novell Groupwise, Apple Mail, etc.

In one configuration, the email client module 104 may include an address book module 106 (or function). The address book module 106 may be an electronic address book that includes one or more entries. Each entry may include contact information for an individual or entity. For example, an entry may include the name of an individual or a company, a phone number, an email address, etc.

In addition, the email client module 104 may include a compose mail module 108 (or function). In one example, the module 108 may generate a new email message. The compose mail module 108 may provide one or more fields in which the sender of the email may enter the recipient's email address, name, or other identifying information.

Further, the email client module 104 may include a spam module 110. In one configuration, the spam module 110 may allow a user to mark an incoming email message as spam. In another embodiment, the spam module 110 may automatically mark an incoming email message as spam depending on certain characteristics of the incoming message. The email client module 104 may also include a deletion module 112 that may allow a user to delete or erase a received email message. In addition, the email client module 104 may include a retention module 114. The retention module 114 may facilitate the storage of a received email message. For example, a user may store an email message in an "inbox", or a sub-directory, sub-folder, etc. of the inbox, or in some other folder or sub-folder.

In one embodiment, the client 102 may further include a temporary email management module 116. The module 116 may be integrated with the email client module 104 in order to allow a user to manage and control one or more temporary email addresses through the email client module 104. In one embodiment, the temporary email management module 116 may be a plug-in or proxy shell extension that modifies the email client module 104.

In one configuration, temporary (or disposable) email addressing may refer to an alternative way of sharing and managing email addresses. Temporary email addressing may set up a new, unique email address for each contact or entity, establishing a point-to-point connection between a sender and a recipient. In one example, a temporary email address may be used in situations where the email address may be sold or released to a spam list or to other unscrupulous entities. For example, a user may use a temporary email address for online registrations for things such as discussion groups, bulletin boards, chat rooms, online shopping, file hosting services, etc. As previously stated, the temporary email management module 116 may be integrated with the email client module 104 so that the user may effectively manage temporary email addresses (in addition to non-temporary email addresses) through the email client module 104.

In one configuration, the server 118 may host the temporary email management module 116. The email client module 104 may be integrated with the temporary email management module 116 over the network connection 120.

Figure 2:
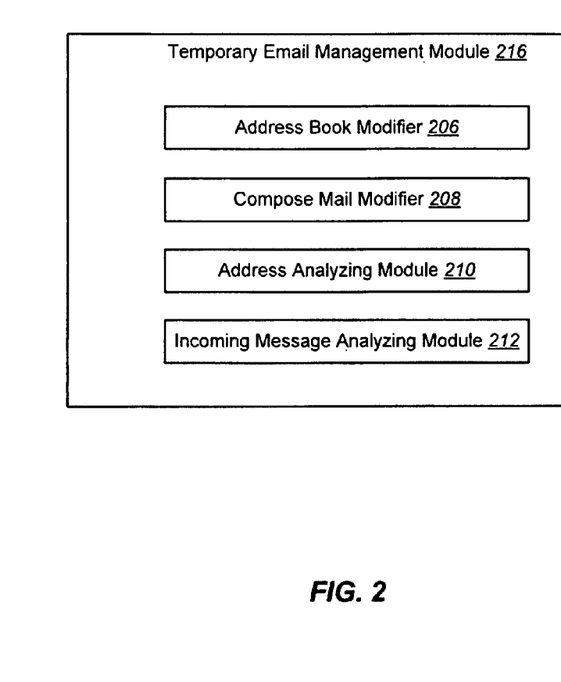
FIG. 2 is a block diagram illustrating one embodiment of the temporary email management module.

FIG. 2 is a block diagram illustrating one embodiment of a temporary email management module 216. In one configuration, the module 216 may include an address book modifier 206, a compose mail modifier 208, an address analyzing module 210, and an incoming message analyzing module 212.

In one configuration, the address book modifier 206 may modify the address book module 106. The modifier 206 may add an attribute to the address book 106 that allows a user to specify whether a temporary or a non-temporary email address should be associated with an entry in the address book. In other words, the address book modifier 206 modifies the address book to allow the user to specify whether a temporary email address or a non-temporary email address should be used as the "from" or "return" email address for a particular entry in the address book. When an email message is sent to a recipient email address, the originating email address may either be a temporary email address or a non-temporary email address, depending on the selection made by the user (the originator of the email message). If the recipient chooses to send back a "reply" email message, the "reply" email message may be sent to either the temporary email address or the non-temporary email address, depending on which email address is associated with the recipient.

In one embodiment, the compose mail modifier 208 may modify the compose mail module 108 so that a user may select whether a temporary email address or a non-temporary email address is associated with each intended recipient of the email message. In other words, the compose mail module 108 is modified to allow the sender of an email message to specify whether the "from" or "return" email address is a temporary email address or a non-temporary email address for each anticipated recipient of the message.

In one example, a recipient specified in a "to" field of the new email message may not be currently within the address book. In one embodiment, the recipient's email address may be added to the address book and a temporary email address may be associated with the recipient as the "from" or "return" email address. The temporary email address may be associated with the recipient by default. In another embodiment, a user may override the default association of a temporary email address with a recipient that is not currently in the address book. In one configuration, appropriate heuristics may be employed to choose a temporary email address (e.g., an existing temporary address if an recipient is already assigned one, or a new temporary address is none are currently assigned).

The address analyzing module 210 may determine whether there is a return address collision. In one configuration, the analyzing module 210 may determine whether different email addresses are associated with each recipient in the "to" field of the new email message. For example, a new email message may be intended for Recipient A, Recipient B, and Recipient C. Recipients A and B may be associated with a non-temporary email address while Recipient C is associated with a temporary email address. As another example, Recipient A may be associated with a first temporary email address, Recipient B may be associated with a second temporary email address, and Recipient C may be associated with a third temporary email address. Each of these temporary email addresses may be different. These examples present a return address collision because the return addresses associated with each recipient of the email message are not the same.

In one embodiment, an alert or other visual feedback (e.g., recipient colorization) may be used to provide feedback to the user if there are temporary-temporary address collisions among the intended recipients, or if there is a temporary/non-temporary conflict among addresses. Non-temporary/non-temporary address conflicts are also possible, if multiple non-temporary addresses are supported, for example for work versus personal usage, etc. The alert or feedback may allow the user to remedy the return address collision by selecting return addresses that are the same for each recipient through the compose mail module 108, or alternatively, the identical message may be sent separately to each recipient, or by some other resolution method. In one configuration, if no selection is made by the user, a determination as to which return address to use for the recipients is made by determining if a common return address has been specified for the recipients in the address book. In one example, this determination may be aided by heuristics. In another embodiment, a user-settable default selection may be executed. For example, if a return address collision is detected, the default remedy may be to use a particular temporary email address as the "from" or "return" email address for each intended recipient of the message.

The temporary email management module 216 may further include an incoming message analyzing module 212. In one configuration, the module 212 may analyze incoming email messages received by the email client module 104. In one example, the module 212 may identify certain actions taken on the incoming email message. For example, the module 212 may determine whether an incoming message is flagged as a spam message by the email client module 104. In addition, the module 212 may determine whether the incoming message is deleted by the user before or after the message had been opened. Further, the module 212 may determine whether the incoming message is retained before or after opening the message. For example, the module 212 may determine whether an incoming message is stored within a sub-directory or a sub-folder of the "inbox" or any other retention folder or sub-folder accessible by the email client module 104.

Figure 3:
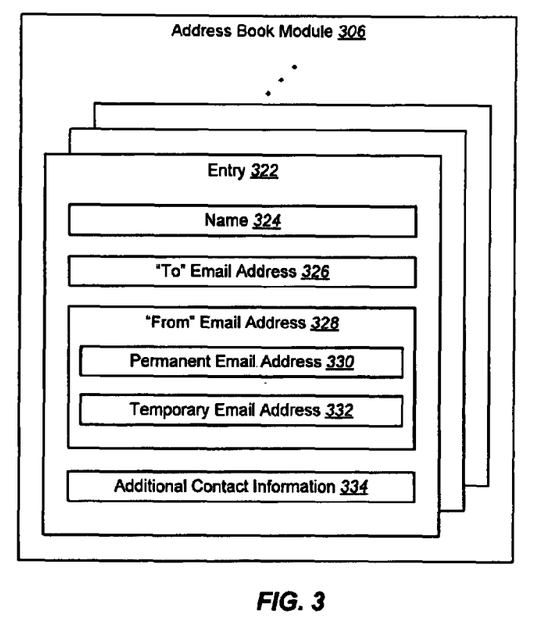
FIG. 3 is a block diagram illustrating one embodiment of an address book module.

FIG. 3 is a block diagram illustrating one embodiment of an address book module 306. In one configuration, the module 306 may include one or more entries 322. An entry 322 may include a name field 324 that may include the name of an individual or the name of a company. The entry 322 may also include a "to" email address field 326. The "to" field 326 may include an email address associated with the individual or entity identified in the name field 324.

The entry 322 may also include a "from" email address field 328. The "from" field 328 may include a permanent email address 330 and/or a temporary email address 332. In one configuration, a user may select whether a permanent email address 330 or a temporary email address 332 is associated with the entry 322. For example, a new email message may be composed. The intended recipient of the email message may be an individual, Recipient A. The email address for Recipient A may be inserted into the "to" email address field 326. In one embodiment, the "from" email address field 328 may indicate which email address should be used as a return email address should Recipient A send a return email message in response. As stated above, a user may select whether a permanent email address 330 or a temporary email address 332 should be used as the return email address when an email message is sent to Recipient A.

In one embodiment, the entry 322 may also include additional contact information 334. The additional contact information 334 may include an address for the entity identified in the name field 324, a telephone number, etc.

Figure 4:
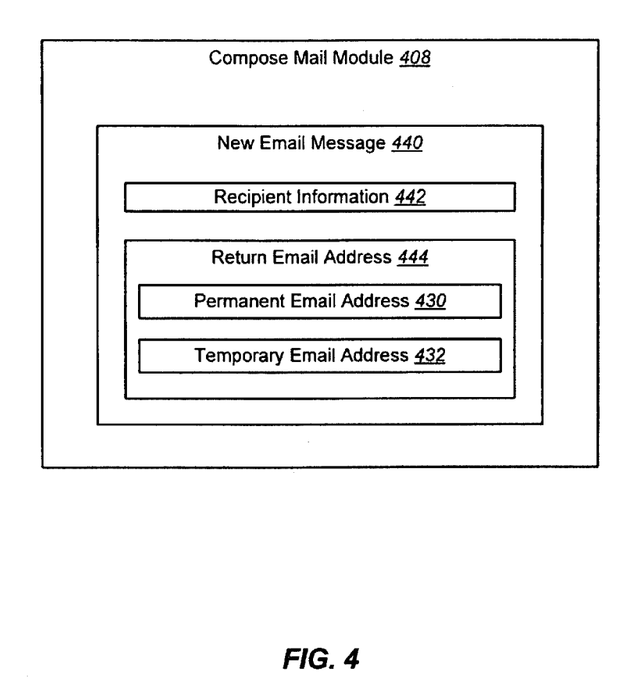
FIG. 4 is a block diagram illustrating one embodiment of a composed mail module.

FIG. 4 is a block diagram illustrating one embodiment of a compose mail module 408. The module 408 may generate a new email message 440. In one configuration, the message 440 may include a recipient information field 442. The field 443 may include an email address, the name of an individual, or the name of an entity to which the message 440 is intended. In one embodiment, the message 440 may also include a return email address field 444. The field 444 may allow the originator of the email message 440 to select whether the return email address 444 is a permanent email address 430 or a temporary email address 432. In other words, when a user generates a new email message 440, the user may select whether a permanent email address 430 or a temporary email address 432 is used as a return email address should the recipient of the message 440 send a email message in response.

Figure 5:
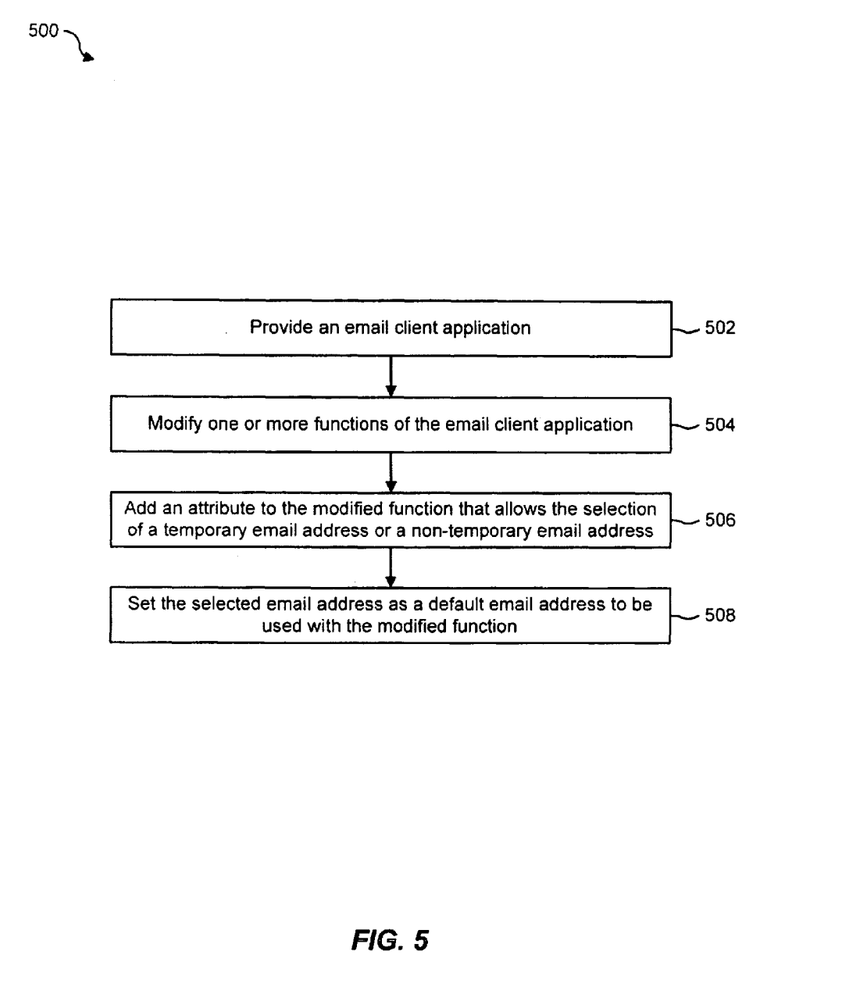
FIG. 5 is a flow diagram illustrating one embodiment of a method for integrating the management of a temporary email account with an email client module.

FIG. 5 is a flow diagram illustrating one embodiment of a method for integrating the management of a temporary email account with an email management module. In one embodiment, the method 500 may be implemented by the temporary email management module 116.

In one configuration, an email client application may be provided 502. In one example, one or more functions of the email client application may be modified 504. For example, an address book function, a compose mail function, etc., may be modified 504. In one embodiment, an attribute may be added 506 to the modified function. In one configuration, the attribute may allow a user to select a temporary email address or a non-temporary email address. In addition, the selected email address may be set 508 as a default email address to be used with the modified function. In one example, the user may override the default settings such that the selected email address is not set as the default email address for the modified function.

In one embodiment, the method 500 may be implemented on a client computing device 102. In another embodiment, the method 500 may be implemented on a server 118 in communication with the client 102 or over a network connection 120.

Figure 6:
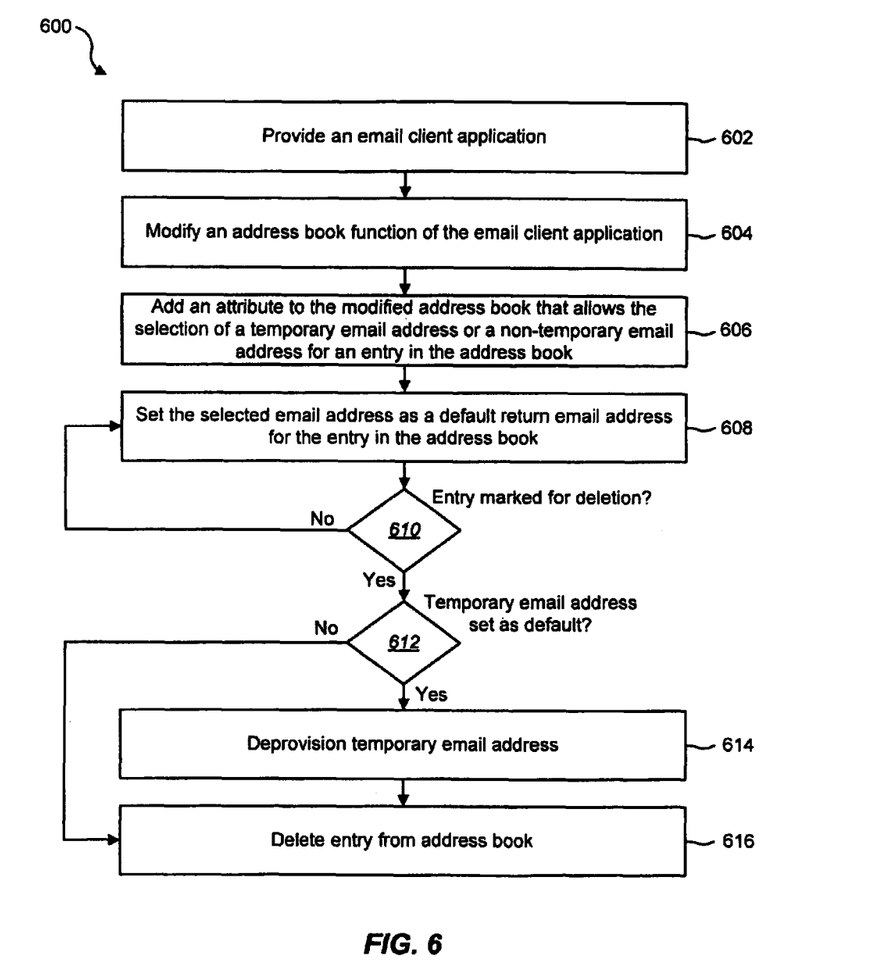
FIG. 6 is a flow diagram illustrating one embodiment of a method 600 for modifying an address book function within an email client module.

FIG. 6 is a flow diagram illustrating one embodiment of a method 600 for modifying an address book function 106 within an email client application 104. The method 600 may be implemented by the temporary email management module 116.

In one embodiment, an email client application 104 may be provided 602. An address book function 106 implemented by the email client application 104 may be modified 604. In one example, an attribute may be added 606 to the modified address book function 106. The attribute may allow a user to select a temporary email address or a non-temporary email address for each entry in the address book 106. In one configuration, the selected email address may be set 608 as a default return email address for the entry in the address book.

In one configuration, a determination 610 may be made as to whether the entry is marked for deletion. If it is determined 610 that the entry is not marked for deletion, the selected email address may continue to remain the default return email address for that entry in the address book. However, if it is determined 610 that the entry is marked for deletion, a second determination 612 may be made as to whether a temporary email address is set as the default return email address for that entry. If it is determined 612 that a temporary email address is not set as the default return email address, the entry may be deleted 616 from the address book.

If it is determined 612, however, that a temporary email address is set as the default return email address for the entry, the temporary email address may be deprovisioned 614. In other words, the temporary email address may be deactivated. The method 600 may then continue to delete 616 the entry from the address book.

Figure 7:
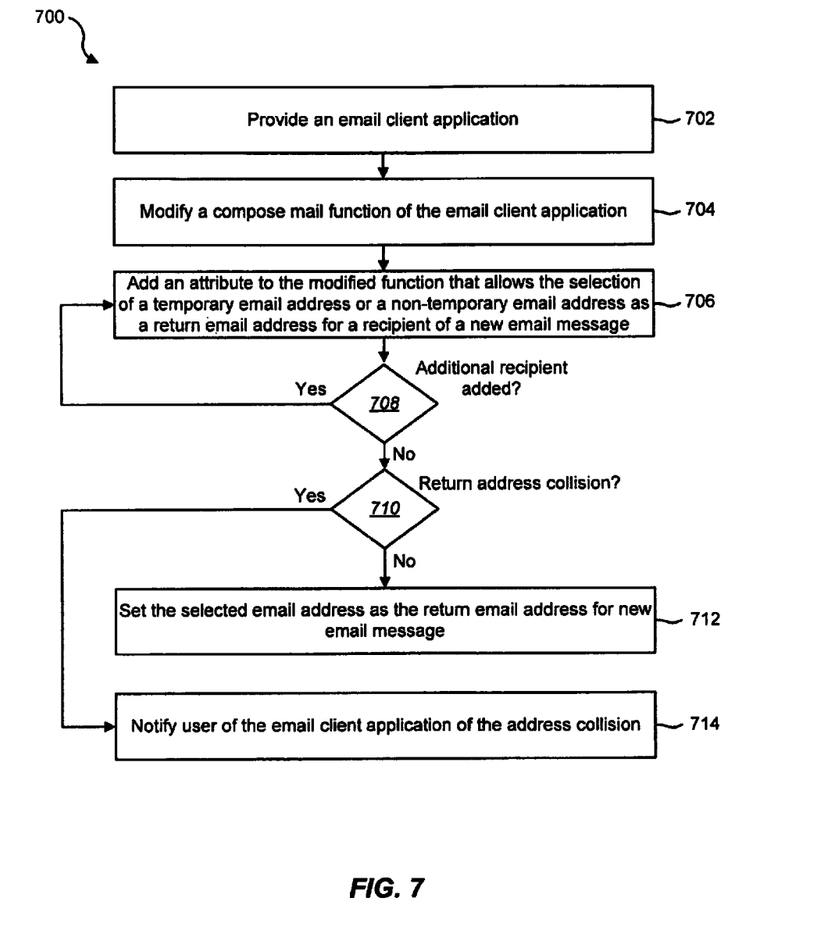
FIG. 7 is a flow diagram illustrating one embodiment of method for modifying a compose mail function implemented by an email client module.

FIG. 7 is a flow diagram illustrating one embodiment of method for modifying a compose mail function 108 implemented by an email client application 104. In one configuration, the method 700 may be implemented by the temporary email management module 116.

In one embodiment, an email client application 104 may be provided 702. A compose mail function implemented by the email client application may be modified 704 by adding 706 an attribute to the modified function. In one configuration, the added attribute may allow a user to select a temporary email address or a non-temporary email address as a return email address for a recipient of a new email message.

In one example, a determination 708 may be made as to whether an additional recipient is included for the new email message. If it is determined that an additional recipient is added to the new email message, an attribute may be added 706 to the modified compose mail function that allows the sender of the email message to select whether a temporary email address or a non-temporary email address should be used as the return email address for that particular recipient.

If it is determined 708 that there are no more additional recipients for the email message, a second determination 710 may be made as to whether a return address collision exists. A return address collision may exist if different return email addresses are assigned to each recipient of an email message. In other words, a first recipient may be associated with a permanent email message as the return email message, and a second recipient may be associated with a temporary email message as the return email address. The permanent email address and the temporary email address may be different and a return address collision may exist. If it is determined 710 that a return address collision does exist, the user of the email client application may be notified 714 of the address collision. If, however, it is determined 710 that a return address collision does not exist, the selected email address may be set 712 as the return email address for the new email message.

Figure 8:
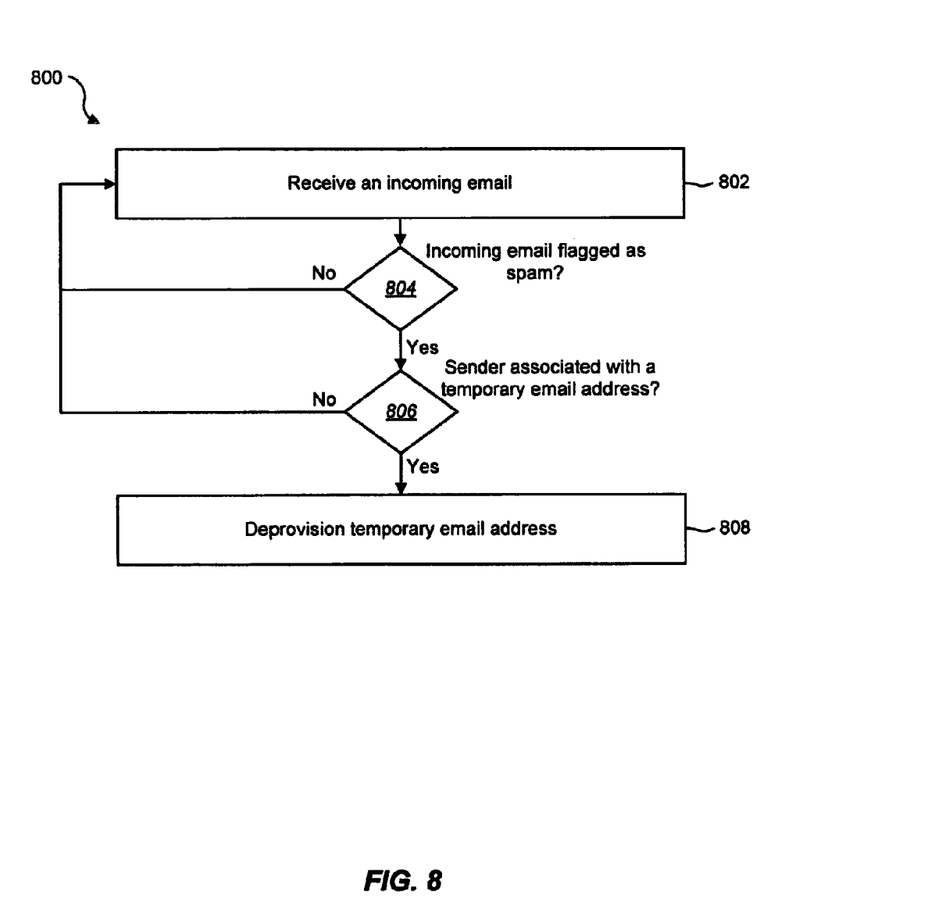
FIG. 8 is one example of a flow diagram illustrating a method for deactivating a temporary email address that is associated with an incoming message marked as SPAM.

FIG. 8 is one example of a flow diagram illustrating a method 800 for deprovisioning (or deactivating) a temporary email address that is associated with an incoming message marked as spam. In one configuration, the method 800 may be implemented by the temporary email management module 116 that is integrated with an email client application 104.

In one configuration, an incoming email message may be received 802. A determination 804 may be made as to whether the incoming email message is flagged as spam. If it is determined 804 that the incoming email message is not flagged as spam, the method 800 may return to receive additional incoming email messages. If, however, it is determined 804 that the incoming email message is flagged as spam, a second determination 806 may be made as to whether the sender of the incoming email message is associated with a temporary email address. If it is determined 806 that the sender is not associated with a temporary email address, the method 800 may return to receive additional incoming email messages. If, however, it is determined 806 that the sender is associated with a temporary email address, the temporary email address may be deprovisioned 808. In other words, the incoming spam message is addressed to a temporary email address. This temporary email address may then be deprovisioned 808 at the email client application 104 via the temporary email management module 116.

Figure 9:
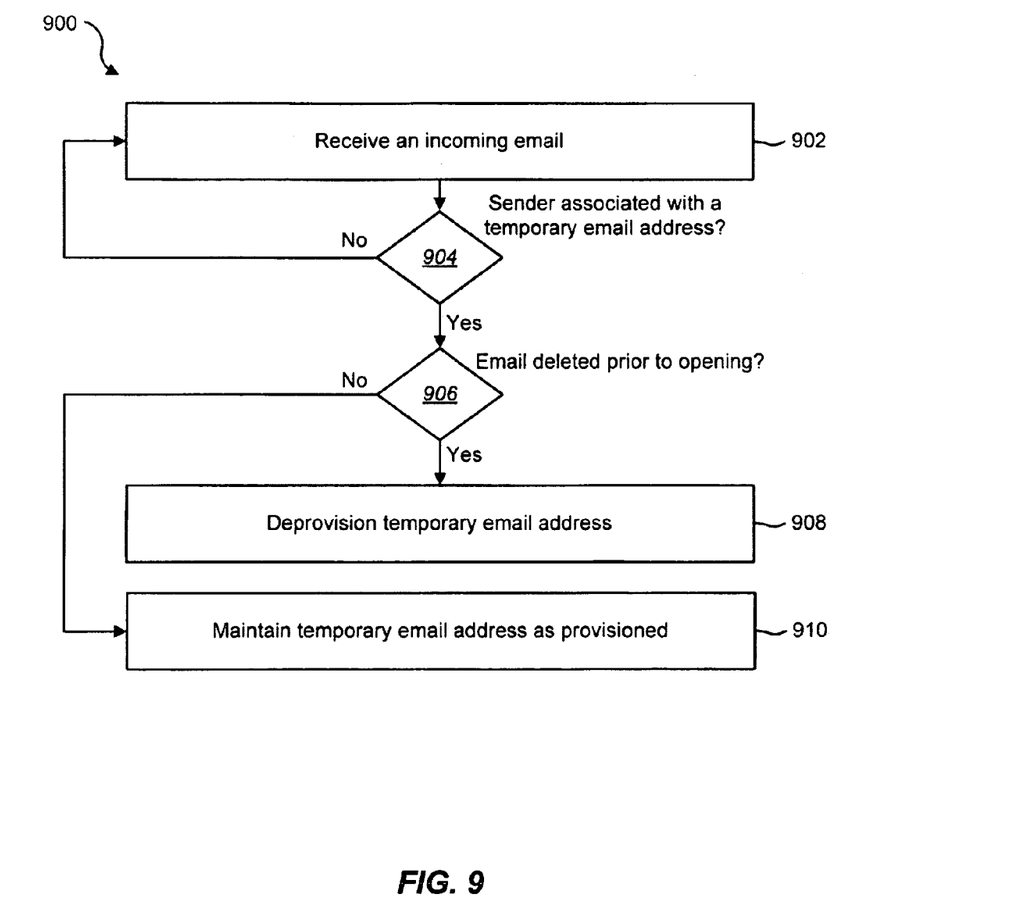
FIG. 9 is a flow diagram illustrating one embodiment of a method for managing temporary email addresses based on actions taken on an incoming email message.

FIG. 9 is a flow diagram illustrating one embodiment of a method 900 for managing temporary email addresses based on actions taken on an incoming email message received at an email client application 104. In one example, the method 900 may be implemented by the temporary email management module 116 that is integrated with the email client application 104.

In one configuration, an incoming email message may be received 902. A determination 904 may be made as to whether the sender of the email message is associated with a temporary email address. The determination 904 may be made by analyzing the address book 106 to determine if the sender is included as an entry in the book. If the sender is in the address book 106, the method 900 may determine 904 if the "from" email address field includes a temporary email address. In another embodiment, the determination 904 may be made by analyzing the email address in the "to" field of the incoming message. The "to" field may include either a temporary email address or a non-temporary email address.

If it is determined 904 that the sender is not associated with a temporary email address, the method 900 may return to receive additional incoming email messages. If, however, it is determined 904 that the sender is associated with a temporary email address, a second determination 906 may be made as to whether the incoming email message is deleted prior to being opened. If it is determined 906 that the email is not deleted before being opened, the temporary email address may be maintained 910 as provisioned, or activated. If, however, it is determined 906 that the email is deleted prior to being opened, the temporary email address may be deprovisioned 908, or deactivated.

Figure 10:
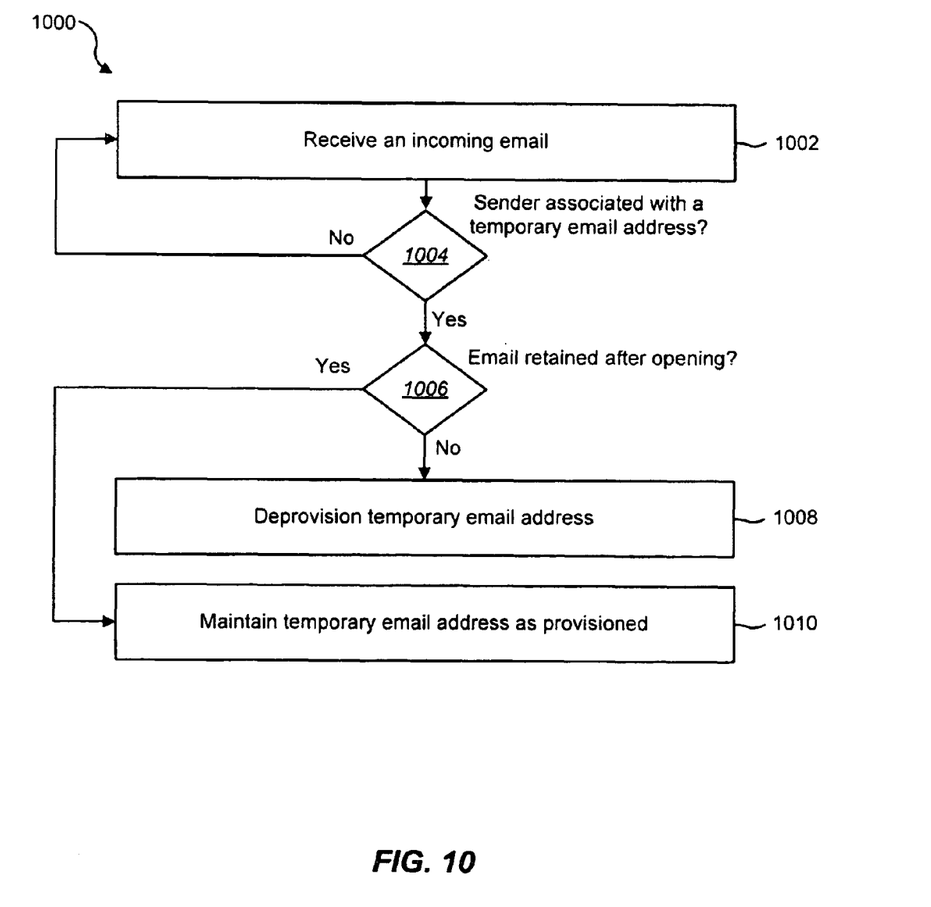
FIG. 10 is a flow diagram illustrating one embodiment of a method for managing a temporary email address based on retention actions taken on an incoming email message.

FIG. 10 is a flow diagram illustrating one embodiment of a method 1000 for managing a temporary email address based on retention actions taken on an incoming email message by an email client application 104. The method 1000 may be implemented by the temporary email management module 116 that is integrated with the email client application 104.

In one embodiment, an incoming email message may be received 1002. A determination 1004 may be made as to whether the sender of the email message is associated with a temporary email address. If it is determined 1004 that the sender is not associated with a temporary email address, the method 1000 may return to receive additional incoming email messages. If, however, it is determined 1004 that the sender is associated with a temporary email address, a second determination 1006 may be made as to whether the incoming email message is retained after being opened. In other words, a determination 1006 may be made as to whether the email message is stored or moved to a sub-folder or sub-directory of the "inbox" provided by the email client application 104. If it is determined 1006 that the email is retained after being opened, the temporary email address may be maintained 1010 as provisioned, or activated. If, however, it is determined 1006 that the email message is not retained after being opened (e.g., the email messages is deleted after being opened) the temporary email address may be deprovisioned 1008, or deactivated.

Figure 11:
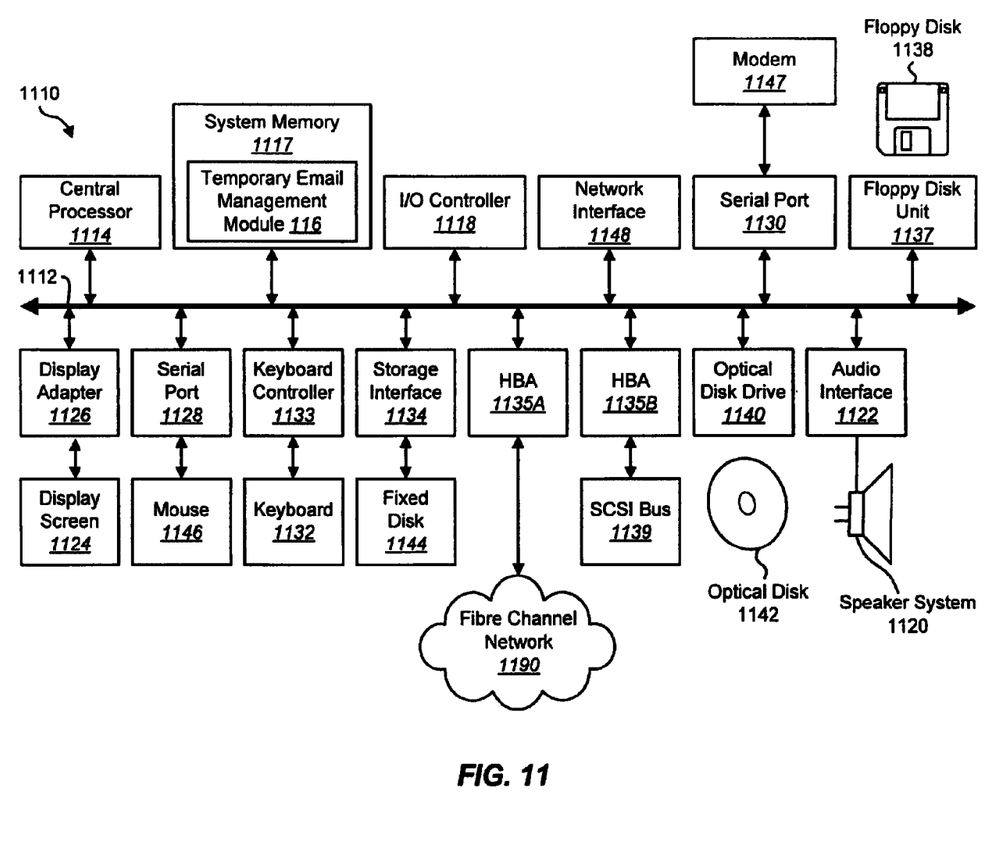
FIG. 11 depicts a block diagram of a computer system suitable for implementing the present systems and methods.

FIG. 11 depicts a block diagram of a computer system 1110 suitable for implementing the present systems and methods. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fibre Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the temporary email management module 116 to implement the present systems and methods may be stored within the system memory 1117. Applications resident with computer system 1110 are generally stored on and accessed via a computer readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. The operation of a computer system such as that shown in FIG. 11 is readily known in the art and is not discussed in detail in this application. Examples of the computer system 1110 may include smart phones, personal digital assistants (PDAs), and other mobile internet devices (MIDs) and netbooks, any of which may host an email client. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 12:
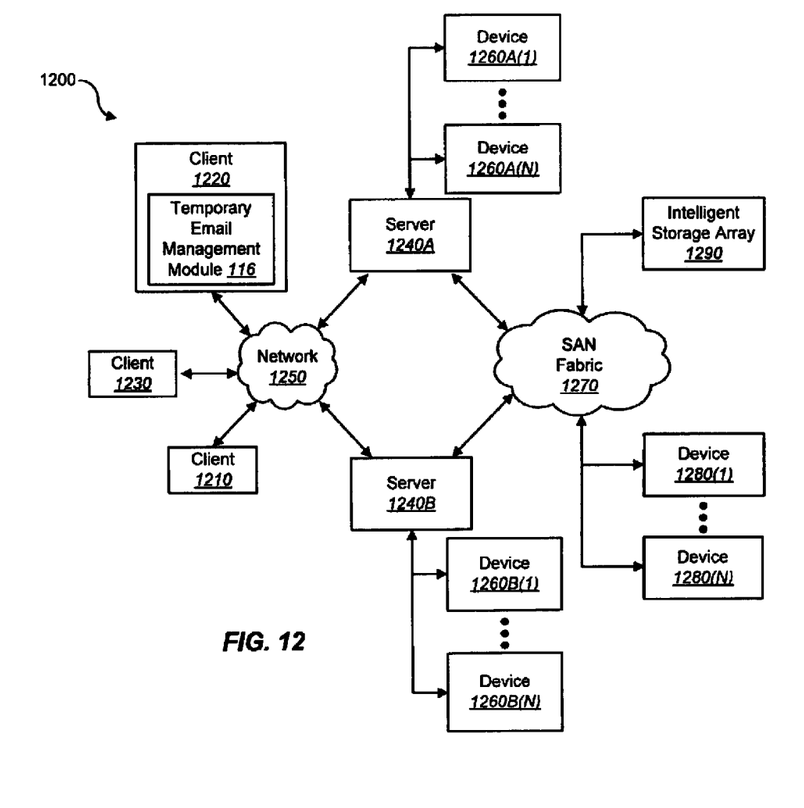
FIG. 12 is a block diagram depicting a network architecture in which client systems and storage servers are coupled to a network.

FIG. 12 is a block diagram depicting a network architecture 1200 in which client systems 1210, 1220 and 1230, as well as storage servers 1240A and 1240B (any of which can be implemented using computer system 1110), are coupled to a network 1250. In one embodiment, the temporary email management module 116 to implement the present systems and methods may be located within a client system 1210, 1220, 1230. The storage server 1240A is further depicted as having storage devices 1260A(1)-(N) directly attached, and storage server 1240B is depicted with storage devices 1260B(1)-(N) directly attached. Storage servers 1240A and 1240B are also connected to a SAN fabric 1270, although connection to a storage area network is not required for operation of the disclosure. SAN fabric 1270 supports access to storage devices 1280(1)-(N) by storage servers 1240A and 1240B, and so by client systems 1210, 1220 and 1230 via network 1250. Intelligent storage array 1290 is also shown as an example of a specific storage device accessible via SAN fabric 1270.

With reference to computer system 1110, modem 1147, network interface 1148 or some other method can be used to provide connectivity from each of client computer systems 1210, 1220 and 1230 to network 1250. Client systems 1210, 1220 and 1230 are able to access information on storage server 1240A or 1240B using, for example, a web browser or other client software (not shown). Such a client allows client systems 1210, 1220 and 1230 to access data hosted by storage server 1240A or 840B or one of storage devices 1260A(1)-(N), 1260B(1)-(N), 1280(1)-(N) or intelligent storage array 1290. FIG. 12 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method, comprising:
    integrating management of an existing temporary email address within an email client application, wherein the email client application further manages an existing non-temporary email address;
    initializing the email client application;
    modifying a function of the email client application, wherein the function is an address book function or a compose mail function of the email client application;
    adding an attribute to the modified function, wherein the attribute is configured to allow the selection of an existing temporary email address or an existing non-temporary email address to be associated with an entry in the address book function;
    setting the selected email address as a default email address for the modified function;

determining whether a new email message is intended for more than one recipient; and upon determining that the new email message is intended for more than one recipient, determining whether a different return email address is associated with each recipient.

2. The method of claim 1, further comprising determining whether an entry in the address book function is marked for deletion.

3. The method of claim 2, further comprising determining whether an existing temporary email address is associated with the entry marked for deletion.

4. The method of claim 3, further comprising deprovisioning the temporary email address if a temporary email address is associated with the entry marked for deletion.

5. The method of claim 1, wherein the attribute is configured to allow the selection of an existing temporary email address or an existing non-temporary email address to be designated as a return email address for a new email message created by the compose mail function.

6. The method of claim 1, further comprising receiving an incoming email message, determining whether a sender of the email message is associated with an existing temporary email address, identifying the incoming email message as spam, and deprovisioning the temporary email address.

7. The method of claim 1, further comprising receiving an incoming email message, determining whether a sender of the email message is associated with an existing temporary email address, determining when the email message is deleted, and deprovisioning the temporary email address based on when the email message is deleted.

8. A computer system comprising:

a processor;

memory in electronic communication with the processor;

the processor configured to integrate management of an existing temporary email address and an existing non-temporary email address within an email client application;

the email client application stored in the memory and configured to manage existing temporary and existing non-temporary email addresses;

a temporary email address management module configured to integrate with the email client application and is further configured to:

modify a function of the email client application, wherein the function is an address book function or a compose mail function of the email client application;

add an attribute to the modified function, wherein the attribute is configured to allow the selection of an existing temporary email address or an existing non-temporary email address to be associated with an entry in the address book function;

set the selected email address as a default email address for the modified function;

determine whether a new email message is intended for more than one recipient; and upon determining that the new email message is intended for more than one recipient, determine whether a different return email address is associated with each recipient.

9. The computer system of claim 8, wherein the temporary email address management module is further configured to deprovision an existing temporary email address associated with an entry in the address book function that is marked for deletion.

10. The computer system of claim 8, wherein the attribute is configured to allow the selection of an existing temporary email address or an existing non-temporary email address to be associated as a return email address with a new email message created by the compose mail function.

11. The computer system of claim 8, wherein the temporary email address management module is further configured to receive an incoming email message, determine whether a sender of the email message is associated with an existing temporary email address, identify the incoming email message as spam, and deprovision the temporary email address.

12. A computer-program, the computer-program product comprising a non-transitory computer-readable storage medium having instructions stored thereon, the instructions comprising:

code programmed to integrate management of an existing temporary email address and an existing non-temporary email address within an email client application:

code programmed to initialize the email client application;

code programmed to modify a function of the email client application, wherein the function is an address book function or a compose mail function of the email client application;

code programmed to add an attribute to the modified function, wherein the attribute is configured to allow the selection of an existing temporary email address or an existing non-temporary email address to be associated with an entry in the address book function;

code programmed to set the selected email address as a default email address for the modified function;

code programmed to determine whether a new email message is intended for more than one recipient; and upon determining that the new email message is intended for more than one recipient, code programmed to determine whether a different return email address is associated with each recipient.

* * * * *